No. 773,260. PATENTED OCT. 25, 1904.
E. KEARNEY.
WIRE FENCE.
APPLICATION FILED MAR. 9, 1904.
NO MODEL.

Witnesses
Edward R. Monroe.
Georgiana Chase

Inventor
Edward Kearney
By Luther V. Moulton
Attorney

No. 773,260. Patented October 25, 1904.

UNITED STATES PATENT OFFICE.

EDWARD KEARNEY, OF JACKSON, MICHIGAN, ASSIGNOR TO ANSON C. MILLS, OF JACKSON, MICHIGAN.

WIRE FENCE.

SPECIFICATION forming part of Letters Patent No. 773,260, dated October 25, 1904.

Application filed March 9, 1904. Serial No. 197,274. (No model.)

*To all whom it may concern:*

Be it known that I, EDWARD KEARNEY, a citizen of the United States, residing at Jackson, in the county of Jackson and State of Michigan, have invented certain new and useful Improvements in Wire Fences; and I do hereby declare the following to be a full, clear, and exact description of the invention, such as will enable others skilled in the art to which it appertains to make and use the same.

My invention relates to improvements in wire fences, and more particularly to such fences having horizontal and vertical wires secured at their intersection by a suitable tie or fastening. Heretofore it has been difficult to so secure the tie in place that it will not slip on the wires, and especially on the vertical or stay wire.

The object of my invention is to more effectually secure the fastener from slipping out of place, to provide an improved tie or fastener, and to provide the device with various novel and useful features hereinafter more fully described, and particularly pointed out in the claims, reference being had to the accompanying drawings, illustrating a form of my invention, and in which—

Figure 1:
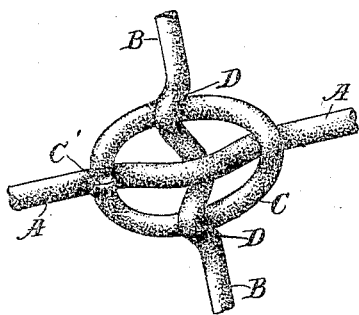
Figure 2:
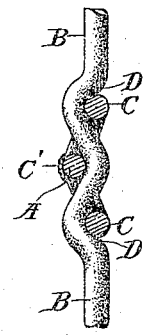

Figure 1 is a perspective of a device embodying my invention, and Fig. 2, a vertical section through the horizontal wire and the tie or fastener.

Like letters refer to like parts in both of the figures.

Heretofore it has been customary in order to secure the fastener from slipping on the wires of the fence to rely upon the obstruction presented by the bending of the wires at their intersection and within the fastener and to secure the ends of the tie or fastener by bending the same around one of the fence-wires or welding it to the same.

My improvement consists in providing one or more shoulders or abrupt bends in the fence-wire outside the fastener or tie and forming shoulders engaging the periphery of the same at one or both sides, whereby the fastener is securely prevented from slipping on the wire, and in welding the ends of the tie to each other to form a continuous link or loop.

In the accompanying drawings, illustrating one form of my invention, A represents one of the horizontal or longitudinal wires of a wire fence as usually constructed; B, one of the vertical wires or stay-wires of the same; C, a tie or fastener at the intersection of the wires, consisting of a link or loop of wire engaging the respective fence-wires at their nonadjacent sides and surrounding the crossing of the wires. The fastener and horizontal wire are most likely to be displaced vertically on the wire B, and to prevent this result the said wire B is provided with one or more abrupt bends or kinks D outside of the fastener or tie C and close to the same, whereby shoulders are presented and engage the periphery of the tie C. The ends of the fastener C are brought together opposite the wire A and welded to each other by any suitable means, (preferably by electric welding,) as at C', whereby the fastener constitutes a solid link or ring, and the structure presents a symmetrical appearance, as shown in Fig. 1.

It is obvious that the particular tie shown need not be used in conjunction with the bends or shoulders in the wire to prevent it from slipping. Various other forms of tie may be thus secured. So, also, welding the ends of the tie to secure the same may be resorted to with or without the said means of preventing the tie from slipping on the wire, and the adjacent ends of other forms of ties may be thus welded.

I have shown shoulders D in the wire B to engage the periphery of the fastener at each side thereof. It is obvious, however, that one may be omitted or that like shoulders may be formed in the wire A, if desirable, without departing from my invention.

Having thus fully described my invention, what I claim, and desire to secure by Letters Patent, is—

1. In a wire fence, crossed wires, a fastener attached to the wires, said crossed wires having one or more short bends each forming a shoulder engaging the periphery of the fastener, and preventing the fastener from slipping on the wires.

2. In a wire fence, crossed wires, a fastener attached to the wires, said crossed wires having short bends outside the fastener and engaging the periphery of the fastener preventing it from slipping on said wires.

3. In a wire fence, the combination of crossed wires, and a fastening in the form of a link, engaging the non-adjacent sides of the said wires and surrounding the crossed portions thereof and also having its ends welded to each other to form a continuous link.

4. In a wire fence, a fastener consisting of a link having its ends welded to form a solid structure, and crossed wires engaged at their non-adjacent sides by said fastener, and having short bends forming shoulders to engage the periphery of the fastener, and prevent the same from slipping on said wires.

5. The herein-described method of constructing wire fences, comprising: forming a fence of horizontal and vertical wires engaging and crossing each other at intervals, placing thereon open links of wire surrounding the crossed portions of said wires, and engaging their non-adjacent sides, welding the ends of the links to each other, and forming abrupt bends in the crossed wires to constitute shoulders engaging the periphery of each link.

In testimony whereof I affix my signature in presence of two witnesses.

EDWARD KEARNEY.

Witnesses:
THOMAS A. WILSON,
A. C. MILLS.